(12) United States Patent
Ferrero et al.

(10) Patent No.: US 8,579,515 B2
(45) Date of Patent: Nov. 12, 2013

(54) FORM-COUPLING ARRANGEMENT IN A BEARING RING FOR A MOTOR VEHICLE WHEEL

(75) Inventors: Alessandro Ferrero, Turin (IT); Marco Gemello, Nichelino (IT); Andreas Knopf, Würzburg (DE); Paolo Re, Nichelino (IT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 13/426,717

(22) Filed: Mar. 22, 2012

(65) Prior Publication Data

US 2012/0251026 A1 Oct. 4, 2012

(30) Foreign Application Priority Data

Mar. 29, 2011 (IT) .......................... TO2011A000275

(51) Int. Cl.
*F16C 33/00* (2006.01)
*F16C 33/64* (2006.01)

(52) U.S. Cl.
USPC ........................................ 384/544; 384/492

(58) Field of Classification Search
USPC ................................. 384/544, 492
See application file for complete search history.

(56) References Cited

U.S. PATENT DOCUMENTS

| 4,715,780 A * | 12/1987 | Kan .............................. 384/492 |
| 6,866,422 B2 * | 3/2005 | Griseri et al. ................ 384/544 |
| 2005/0163410 A1 * | 7/2005 | Sakamoto ..................... 384/544 |
| 2010/0021099 A1 * | 1/2010 | Torii ............................. 384/544 |

FOREIGN PATENT DOCUMENTS

| EP | 0297552 A2 | 1/1989 |
| WO | WO2008147284 A1 | 12/2008 |
| WO | WO2010063299 A1 | 6/2010 |
| WO | WO2011127979 A1 | 10/2011 |

* cited by examiner

*Primary Examiner* — Thomas R Hannon
(74) *Attorney, Agent, or Firm* — Bryan Peckjian; SKF USA Patent Group

(57) ABSTRACT

A bearing ring (10) has a tubular steel core (15) around which is formed an outer body (16) of lightweight material. The outer surface of the core forms a circumferential shoulder (26), a first side of which is subjected to a turning finishing process and provides an undercut surface (23) defining part of an annular groove (22). An axially opposite, second side of the shoulder (26), not subjected to a turning finishing process, has a non-circular portion (29) with radial recesses (28) that act as anti-rotation means cooperating with complementary portions formed by the outer body (16).

9 Claims, 2 Drawing Sheets

FORM-COUPLING ARRANGEMENT IN A BEARING RING FOR A MOTOR VEHICLE WHEEL

CROSS-REFERENCE TO RELATED APPLICATION

This United States Non-Provisional Utility application claims the benefit of Italy Provisional Patent Application Serial No. TO2011A000275, filed on 29 Mar. 2011, which is incorporated herein in its entirety.

FIELD OF THE INVENTION

The present invention relates to a bearing ring having a radially inner core of a first, high toughness material and a radially outer body which is formed around the core and is made of a second material being lighter than the first material. More particularly, the invention relates to a form-coupling arrangement at the interface between the inner core and the outer body.

SUMMARY OF THE INVENTION

The motorcar industry has to comply with an ever increasing demand for weight reduction in motor vehicle components for the sake of cutting down fuel consumption and exhaust emissions. With a vehicle wheel bearing, weight reduction may not imply any reduction in strength and safety. The raceways must be made of a material hard enough to resist the stresses of rolling contact. Conventional bearing grade steel is still widely used. The raceways are heat treated so as to attain a level of hardness and microstructure homogeneity adequate to withstand the stresses caused by rolling Hertzian contact.

Recent flanged bearing rings include a radially inner, annular or tubular insert (or core) made of bearing grade steel and forming one or two raceways, and a radially outer body forming a radially outwardly extending flange around the insert and made of a lightweight material such as aluminium alloy. The lightweight flange is designed to mount the wheel and/or the brake rotor and transfer loads from these components to the tubular insert.

WO 2008/147284 A1 discloses a bearing ring made up of two different materials joined together in a single piece, namely a first, high toughness material such as bearing grade steel forming the raceways and a second, lightweight material, such as a lightweight metal, forming the rest of the ring. The second material is joined to the first material through a forming process.

It is a primary object of the present invention to provide an intimate, reliable coupling between the two different portions of a bearing ring made of two different materials, namely a first, hard material and a second, lightweight material. Particularly, it is desired to provide an axially compact and effective form-coupling arrangement capable of opposing any combination of forces and stresses, throughout the whole range of working conditions, tending to cause relative displacement of the core with respect to the outer body.

The above and further objects and advantages are attained, in accordance with the invention, by a form-coupling arrangement as defined in claim 1. Preferred embodiments of the invention are defined in the dependent claims.

BRIEF DESCRIPTION OF THE DRAWINGS

In order that the present invention may be well understood there will now be described a preferred embodiment thereof, given by way of example, reference being made to the accompanying drawings, in which.

DETAILED DESCRIPTION OF THE INVENTION

Figure 1:
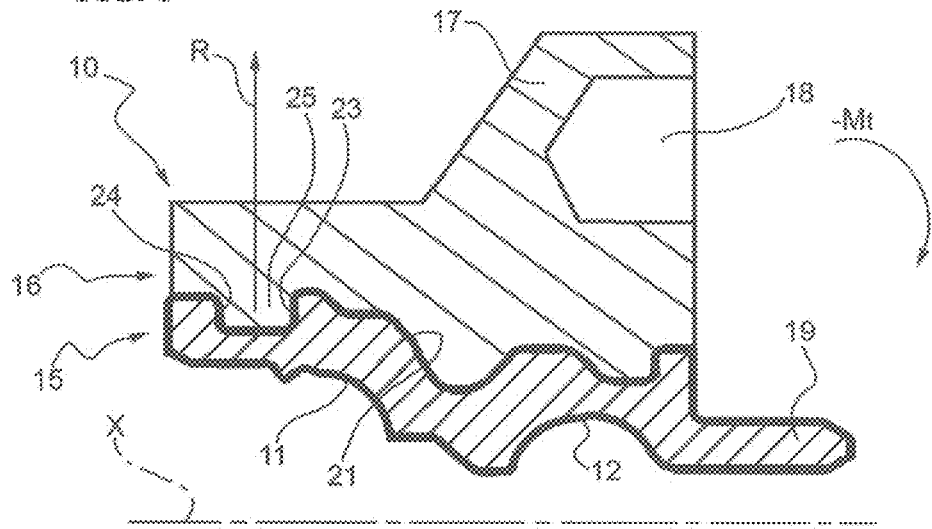
FIG. 1 is a partial, axial cross-sectional view of an embodiment of a flanged bearing ring according to the invention.
Figure 2:
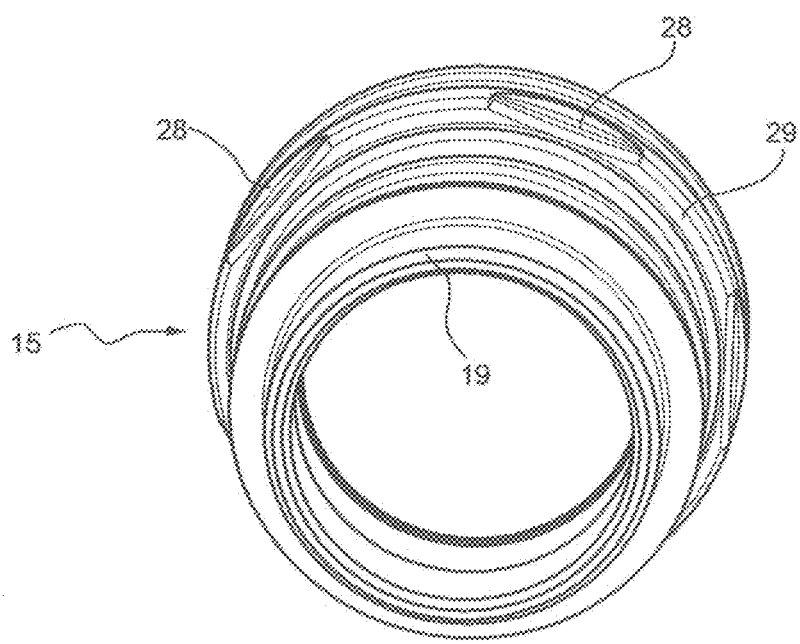
FIG. 2 is a perspective view of a steel tubular core constituting the inner part of the flanged bearing ring of FIG. 1.
Figure 3:
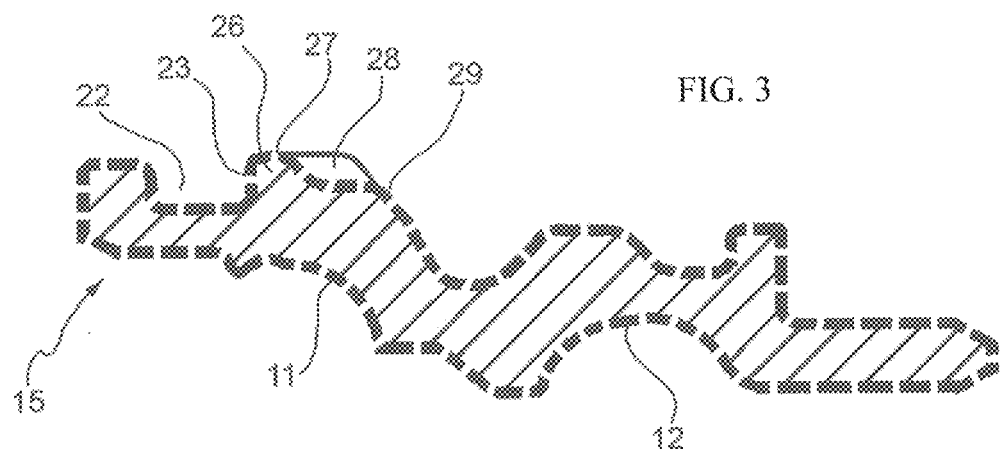
FIG. 3 is an axial cross-sectional view of the tubular core of FIG. 2, schematically showing in full line the surfaces that are processed differently from those shown in phantom line.

Referring initially to FIG. 1, designated overall at 10 is a flanged bearing ring implementing an embodiment of the invention. The ring 10 is designed to be the outer, rotatable ring of a double-row angular contact ball bearing for vehicle applications, particularly for mounting to a vehicle wheel (not shown) to be rotationally supported relative to a stationary suspension standard (not shown) of the vehicle around a central axis of rotation x. Throughout the present description and the claims, terms and expressions indicating positions and directions such as "radial" and "axial" are understood as referring to the axis of rotation x of the bearing. Expressions such as "inboard" and "outboard" instead refer to a condition when mounted on a vehicle. The invention is not limited to this particular design of bearing rings.

The bearing ring 10 comprises a radially inner insert or core 15 of a generally tubular or annular shape and a radially outer body 16 providing a radially outwardly extending flange 17 at the outboard side of the core 15. The flange 17 provides a number of bores 18 to allow connection to the vehicle wheel by means of stud bolts (not shown).

The core 15 provides two raceways 11, 12 for two rows of bearing balls (not shown) and is therefore made of a first, hard and tough material, preferably a bearing grade steel. The radially outer body 16 is made of a second, lightweight material, typically a lightweight metal such as aluminium, magnesium, or alloys thereof. Other suitable materials for the outer body may include, but not be limited to, carbon composites or reinforced polymers. The tubular core 15 forms an axial tubular extension or spigot 19 at its outboard side, which facilitates centering of the vehicle wheel.

The outer body 16 may be formed around the core 15 in a number of different ways, for example through a semi-solid casting process, or by sintering or casting, or die-casting. At the end of any of these processes, the lightweight material tightly copies the outer shape of the core 15, whereby the inner and outer bodies tightly interlock with one another, as explained herein after.

The outer shape of the core 15 is so designed as to provide a mutual locking action between the inner core and the outer body 16, opposing relative displacement, between these two bodies, that is caused in use by the forces and reactions transmitted through the bearing ring from the wheel and/or the brake to the raceways, and vice versa. These forces and reactions to be resisted are variously combined and act in the axial, radial and circumferential directions.

Relative axial displacement is prevented by the combination of a groove 22 and a radially protruding shoulder 26 extending in the circumferential direction. Relative radial displacement of the outer body away from the axis of rotation x is prevented by an undercut 23 forming one of the side surfaces of the groove. Relative angular displacement in the circumferential direction is avoided by a number of radial notches 28.

Formed in the radially outer surface of the core 15 is a circumferentially extending annular groove 22 bounded on at least one side by an undercut surface 23. In the preferred embodiment shown in FIG. 1, the groove 22 is bounded on both sides by two axially facing negative slope undercuts 23, 24 defining a dovetail joint section with the complementary annular, radially inwardly extending rib 25 formed by the lightweight body 16. In this context, the term "undercut" is to be construed as meaning that at least one of the two sides of the groove 22 has an overhanging portion in relief. For example, the angle of the undercuts may be of about 85 degrees. The undercut(s) 23 (and/or 24) provides a high level of interlock preventing the outer body 16 from moving away from the inner core 15 in a radial direction, perpendicular to the axis of rotation x. The undercut(s) will so provide a radially directed retaining action which is particularly useful in resisting a traction force tending to pull the lightweight material 16 radially away from the steel core 15 as a result of a negative tilting moment −Mt being applied to the bearing ring through the flange 17. The radial resisting force is designated R. It is particularly convenient to locate the undercut (s) 23, 24 at the axially inner end of the bearing ring, i.e. farthest from the flange 17, since at this location the resisting force will exploit the maximum possible length of the lever arm for opposing the tilting moment −Mt. Nevertheless, the invention is not limited to such a location of the groove 22 and its undercut surfaces, which may be formed in another axial position at the interface between the inner core and the outer body.

Furthermore, since a lightweight metal such as aluminium and its alloys has a thermal expansion coefficient higher than that of the bearing grade steel which the core is made of, the dovetail arrangement will provide an even higher degree of mutual locking between the core and the outer body at high temperatures, when the lightweight metal rib 25 will expand more than the steel groove 22 accommodating it.

Immediately adjacent to the annular groove 22, on its outboard side, is the radially outwardly protruding shoulder 26. This shoulder is delimited radially outwardly by a cylindrical surface 27, axially inwardly by the substantially radially oriented undercut surface 23, and axially outwardly by an axially outwardly tapering conical surface 21. In order to provide an efficient anti-rotation coupling between the steel core and the lightweight outer body, a plurality of radial notches 28 are formed in the outer surface of the core 15 by forging. The notches 28 are angularly equally spaced around the central axis of rotation x.

The notches 28, by cooperating with mating, complementary surfaces in the outer body 16, provide a high degree of interlock against relative angular movement between the outer body and the core in a circumferential direction about the axis of rotation x.

The non-turned, non-circular section 29 of the core containing the notches 28 lies on the face of the shoulder 26 opposite to the groove 22. In other terms, the shoulder 26 is turned on one side only, i.e. partially, whereas the opposite side, providing the anti-rotation means such as the radial notches 28, is left unturned in a semi-finished state after the forging step. The part is designed to be manufactured with turning operations, which can only provide surfaces shaped as solids of revolution. The intersection of a turning profile with non-circular shapes generates edges that must be removed by a machining operation by 3D milling machine, to be added on purpose. In order to avoid introduction of said milling operation, the non-circular cross section 29 providing the notches 28 is obtained by forging, whereas the surfaces of the groove 22 and the cylindrical surface 27 of the shoulder 26 must be obtained by subjecting the core to a further turning step. The cylindrical surface 27 joins the non-circular section 29 and the undercut face 23 and extends circumferentially around the entire core 15. In the absence of the cylindrical surface 27, the shoulder 26 would exhibit a back-face requiring specific 3D milling to eliminate edges potentially harmful for the stress distribution. Due to the above arrangement, a simple turning operation provides transition from non axial-symmetric to axial-symmetric area (of the groove 22) with a smooth profile, simultaneously providing a 360-degree shoulder for the groove.

Figure 4:
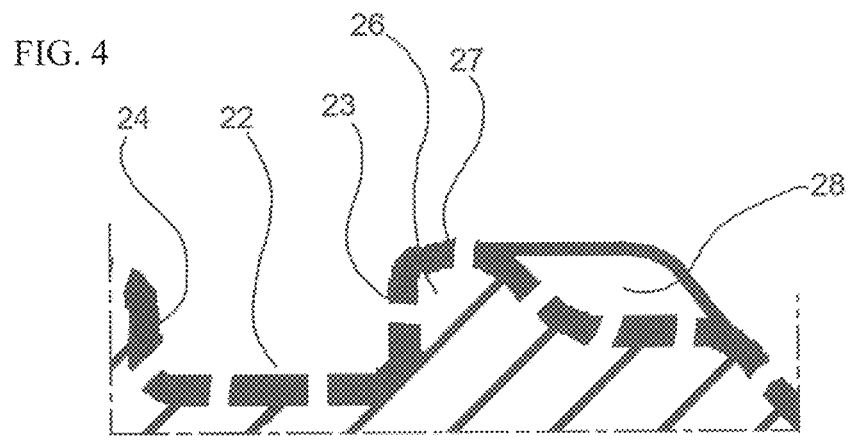
FIG. 4 is an enlarged view of a detail of FIG. 3.

As will be appreciated, the form-coupling arrangement of this invention, as shown separately in FIG. 4, provides a compact design, concentrating in a very axially compact zone several different anti-displacement means, effective in opposing relative displacement against virtually any combination of external forces acting on the bearing ring.

What We claim is:

1. A form-coupling arrangement in a bearing ring for a motor vehicle wheel, located at the interface between a radially inner tubular or annular core made of a first, hardened material and a radially outer body formed around a radially outer surface of the core and made of a second material softer than the first hardened material, wherein the radially outer surface of the core forms a radially outwardly protruding shoulder extending in a circumferential direction and having two axially opposite sides:
a first side, subjected to a turning finishing process, providing an undercut surface which defines part of a circumferentially extending annular groove; and
a second side, not subjected to a turning finishing process, providing a non-circular section with radial recesses providing anti-rotation means cooperating with complementary portions formed by the outer body.

2. The form-coupling arrangement according to claim 1, wherein the protruding shoulder is delimited radially outwardly by a cylindrical surface.

3. The form-coupling arrangement according to claim 2, wherein the cylindrical surface is subjected to a turning finishing process.

4. The form-coupling arrangement according to claim 1, wherein the first material is a bearing grade steel.

5. The form-coupling arrangement according to claim 1, wherein the second material is a lightweight material.

6. The form-coupling arrangement according to claim 5, wherein the lightweight material is chosen among aluminium, magnesium, or alloys thereof, carbon composites, reinforced polymers.

7. The form-coupling arrangement according to claim 1, wherein the radial recesses include notches angularly equally spaced in a circumferential direction around a central axis of rotation of the bearing ring.

8. The form-coupling arrangement according to claim 1, wherein the groove is formed with two axially facing undercuts defining a dovetail joint section with a complementary annular, radially inwardly extending rib formed by the outer body.

9. The form-coupling arrangement according to claim 1, wherein the radially outer body forms a radially outwardly extending flange providing connection to a vehicle wheel.

* * * * *